(12) United States Patent
Matsuoka

(10) Patent No.: US 12,535,479 B2
(45) Date of Patent: Jan. 27, 2026

(54) SYSTEM, INFORMATION PROCESSING DEVICE, AND PROGRAM

(71) Applicant: REVORN CO., LTD., Tokyo (JP)

(72) Inventor: Hiroaki Matsuoka, Tokyo (JP)

(73) Assignee: REVORN CO., LTD. (JP)

( * ) Notice: Subject to any disclaimer, the term of this patent is extended or adjusted under 35 U.S.C. 154(b) by 387 days.

(21) Appl. No.: 18/008,583

(22) PCT Filed: Jun. 15, 2021

(86) PCT No.: PCT/JP2021/022654
§ 371 (c)(1),
(2) Date: Dec. 6, 2022

(87) PCT Pub. No.: WO2021/256460
PCT Pub. Date: Dec. 23, 2021

(65) Prior Publication Data
US 2023/0236167 A1    Jul. 27, 2023

(30) Foreign Application Priority Data

Jun. 17, 2020 (JP) .................................. 2020-104581

(51) Int. Cl.
*G01N 33/497* (2006.01)
*G01N 33/00* (2006.01)

(52) U.S. Cl.
CPC ....... *G01N 33/497* (2013.01); *G01N 33/0031* (2013.01); *G01N 33/0073* (2013.01)

(58) Field of Classification Search
None
See application file for complete search history.

(56) References Cited

U.S. PATENT DOCUMENTS

| | | | |
|---|---|---|---|
| 11,754,528 B2 * | 9/2023 | Hagiwara | G01N 29/022 73/24.06 |
| 2004/0187580 A1 | 9/2004 | Nozaki | |
| 2010/0137733 A1 * | 6/2010 | Wang | A61B 5/411 600/532 |

(Continued)

FOREIGN PATENT DOCUMENTS

| | | |
|---|---|---|
| JP | 2004-317493 A | 11/2004 |
| JP | 2017-504231 A | 2/2017 |
| WO | 2019-117099 A1 | 6/2019 |

OTHER PUBLICATIONS

International Search Report (English and Japanese) issued in PCT/JP2021/022654, mailed Sep. 14, 2021; ISA/JP (7 pages).

(Continued)

*Primary Examiner* — Alexander A Mercado
(74) *Attorney, Agent, or Firm* — Harness, Dickey & Pierce, P.L.C.

(57) ABSTRACT

A system is provided that detects the odor of air exhaled from a subject. Based on affection information and the odor, the system indicates features of the exhaled air related to a disease based on measurement information in which the affection information indicates affection or non-affection. The system also detects the odor in the air from a medical examinee. Based on the measurement information and the features, the system determines the possibility that the medical examinee will be affected with a disease.

14 Claims, 6 Drawing Sheets

(56) References Cited

U.S. PATENT DOCUMENTS

| | | | |
|---|---|---|---|
| 2014/0201182 A1* | 7/2014 | Amin | G06F 16/2455 707/706 |
| 2015/0141073 A1 | 5/2015 | Shen et al. | |
| 2016/0091470 A1* | 3/2016 | Gafsou | G01N 33/0034 73/23.34 |
| 2017/0069010 A1* | 3/2017 | Amin | G01N 33/0031 |
| 2017/0199159 A1 | 7/2017 | Kuroki et al. | |
| 2018/0271404 A1* | 9/2018 | Gupta | G01N 33/497 |
| 2021/0177303 A1* | 6/2021 | Pimentel | A61B 5/4255 |
| 2021/0341461 A1* | 11/2021 | Allsworth | A61K 49/1815 |
| 2022/0034854 A1* | 2/2022 | Chen | A61B 5/091 |
| 2022/0317122 A1* | 10/2022 | Lapidot | A61M 16/085 |
| 2022/0397555 A1* | 12/2022 | Hagiwara | G01N 33/0031 |

OTHER PUBLICATIONS

Jaeschke, C. et al. "Overview on Sniffphone: a Portable Device for Disease Diagnosis" 2019 EEE International Symposium on Olfaction and Electronic Nose (ISOEN), Sep. 5, 2019, pp. 1, 2, chapters 1-3, fig. 1, 2 (7 pages).

Minami, Kosuke et al., "Comprehensive R&D for Olfactory IoT Sensors", Medical Gases, 1-9 2018, vol. 20, No. 1, pp. 23-28, [retrieved on Sep. 6, 2021], Internet: <https://www.jstage.jst.go.jp/article/medicalgases/20/1/20_23/_article/-char/ja>, <https://doi.org/10.32263/medicalgasses.20.1_23>, ISSN: 2434-6959,}m.24, left col. 11. 14-24, p. 25, left col. II. 23-34, p. 25, right col. 1. 3 to p. 27, left col. 1. 4, fig. 2, 4, etc., (Minami, Kosuke), non- official translation (Comprehensive research and development for olfactory IoT sensors) (17 pages).

Lee, J.-J. Cheng et al., "Development of a Quartz Crystal Gas Sensor System for Immediate Detection of Ammonia in Breath", Jun. 20, 2015, vol. as, No. 6, pp. 175-180, [retrieved on Sep. 6, 2021], Internet:<https://www.jstage.jst.go.jp/article/shikizai/88/6/88_175/_article/-char/ja/>, <https://doi.org/10.4011/shikizai.88.175>, chapters1-3, fig. 1, 2, (Lee, S. W., Development of a quartz crystal microbalance sensor system for immediate detection of ammonia in human breath, Journal of the Japan Society of Colour Material) (19 pages).

Chen, C. Y., "Diagnosis of ventilator-associated pneumonia.using electronic:nose sensor array signals: solutions to Improve the application of machine learning in respiratory research", Critical Care [online], Apr. 21, 2008, 12, R56, 1-12, [retrieved on Sep. 6, 2021], Internet <URL:https://ccforum.biomedcentral.com/articles/10 .1186/cc6877>, <DOI: https://doi.org/10.1186/cc6877>, entire text, all drawings (12 pages).

Hao, L. J., "An investigation on electronic nose diagnosis of liver cancer", 2017 10th International Congress on Image and Signal Processing, BioMedical Engineering and Informatics, Oct. 14, 2017, 1-5, [retrieved on Sep. 6, 2021], Internet <URL:https://ieeexplore.ieee.org/document/8302211>, <DOI:10.1109/CISPBMEI.2017.8302211>, entire text, all drawings (5 pages).

European Search Report issued in the corresponding European Application No. 21825452; dated Nov. 8, 2023 (total 9 pages).

* cited by examiner

SYSTEM, INFORMATION PROCESSING DEVICE, AND PROGRAM

CROSS REFERENCE TO RELATED APPLICATIONS

This application is a U.S. National Phase Application under 35 U.S.C. 371 of International Application No. PCT/JP2021/022654, filed on Jun. 15, 2021, which claims priority to Japanese Patent Application No. 2020-104581, filed on Jun. 17, 2020. The entire disclosures of the above applications are expressly incorporated by reference herein.

BACKGROUND

Technical Field

The present invention relates to a system, an information processing apparatus, and a program.

Related Art

In recent years, with development of medical and other sciences, causes of various diseases have been investigated. However, diagnosing whether a person is affected with a particular disease may be time-consuming. For instance, PCR (Polymerase Chain Reaction) method for examining COVID-19 infection may take several hours to a day (as of end of May 2020).

Incidentally, it is known that a dog can identify a person affected with colon cancer or detect abnormal blood sugar level, especially the latter is being promoted as a hypoglycemic alert dog. These detections are presumed to be due to acute sense of odor of the dog.

On the other hand, various research has also been conducted on "odor", and a system for specifying fragrance quality using a plurality of quartz oscillator sensors has been proposed (see WO 2019/117099 A1).

However, when determining presence or absence of a disease by odor, if it is unable to specify odor component specific to a person affected with the targeted disease, it will not be able to train a dog efficiently, and it is anticipated that it will take a long time to disseminate these methods.

In view of the above circumstances, the present invention provides a system, an information processing apparatus, and a program that can assist in determining whether an examinee is affected with a target disease based on an odor of the examinee.

SUMMARY

According to an aspect of the present invention, a system is provided. The system comprises a first measurement apparatus, a first terminal, an information processing apparatus, a second measurement apparatus, and a second terminal. The first measurement apparatus includes a first detection unit including an odor sensor and configured to detect an odor of expiration of a subject using the odor sensor. The first terminal includes a first measurement information generation unit configured to generate first measurement information based on a detection result of the first detection unit and affection information, wherein the affection information is information indicating presence or absence of affection of the subject for a predetermined disease, and a measurement information notification unit configured to notify the first measurement information generated by the first measurement information generation unit to the information processing apparatus. The information processing apparatus includes a measurement information acquisition unit configured to acquire first measurement information notified from the first terminal, a feature information generation unit configured to generate feature information indicating a feature of expiration for the disease based on first measurement information, in which the affection information acquired by the measurement information acquisition unit indicates affection, and first measurement information, in which the affection information acquired by the measurement information acquisition unit indicates non-affection, and a feature information provision unit configured to provide the feature information generated by the feature information generation unit to the second terminal. The second measurement apparatus includes a second detection unit including an odor sensor and configured to detect an odor of expiration of an examinee using the odor sensor. The second terminal includes a second measurement information generation unit configured to generate second measurement information based on a detection result of the second detection unit, a feature information retention unit configured to retain the feature information provided by the information processing apparatus, and a determination unit configured to determine a possibility of affection of the examinee for the disease based on the second measurement information and the feature information.

According to an aspect of the present invention, it is possible to examine whether a person is affected with a target disease in a relatively short time, and to support diagnosis by a physician.

DETAILED DESCRIPTION

Hereinafter, embodiment of the present invention will be described with reference to the drawings. Various features described in the embodiment below can be combined with each other.

A program for realizing a software in the present embodiment may be provided as a non-transitory computer readable medium that can be read by a computer or may be provided for download from an external server or may be provided so that the program can be activated on an external computer to realize functions thereof on a client terminal (so-called cloud computing).

In the present embodiment, the "unit" may include, for instance, a combination of hardware resources implemented by a circuit in a broad sense and information processing of software that can be concretely realized by these hardware resources. Further, various information is performed in the present embodiment, and the information can be represented by, for instance, physical values of signal values representing voltage and current, high and low signal values as a set of binary bits consisting of 0 or 1, or quantum superposition (so-called qubits), and communication/calculation can be performed on a circuit in a broad sense.

Further, the circuit in a broad sense is a circuit realized by combining at least an appropriate number of a circuit, a circuitry, a processor, a memory, or the like. In other words, it is a circuit includes application specific integrated circuit (ASIC), programmable logic device (e.g., simple programmable logic device (SPLD), complex programmable logic device (CPLD), field programmable gate array (FPGA)), or the like.

1. Overview of System

Figure 1:
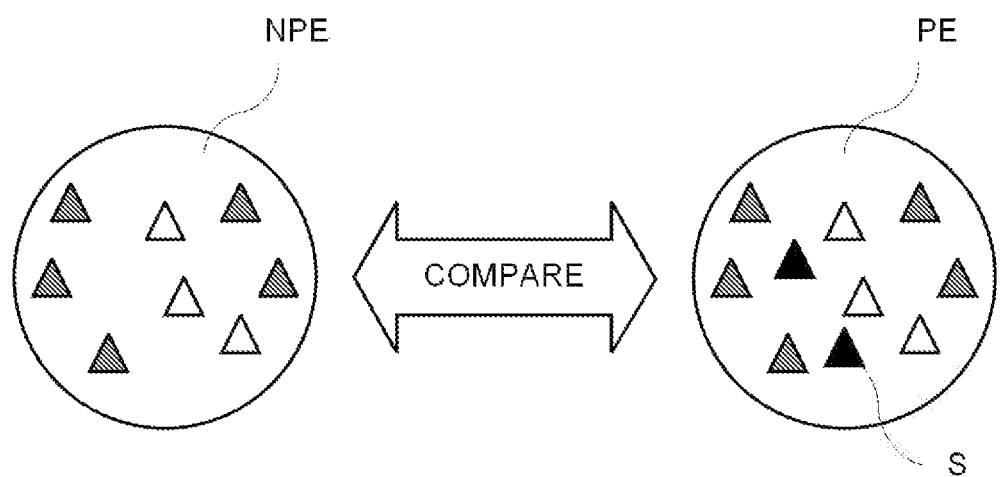
FIG. 1 is a diagram illustrating an overview of a system according to an embodiment of the present invention.

FIG. 1 is a diagram illustrating an overview of a system according to an embodiment of the present invention. The system compares an expiration NPE of a unaffected person with an expiration PE of an affected person of a target disease, and specifies an odor component S contained only in the expiration PE of the affected person. However, a substance name and origin (cause of occurrence) of the odor component S may be unknown, and presence or absence of the disease is determined by whether the odor component S is contained in the expiration. Hereinafter, although an example of using the expiration of an examinee as a measurement target will be described, instead of the expiration of the examinee, an odor of sweat or excrement of the examinee may be used as the measurement target.

2. Configuration of System

Figure 2:
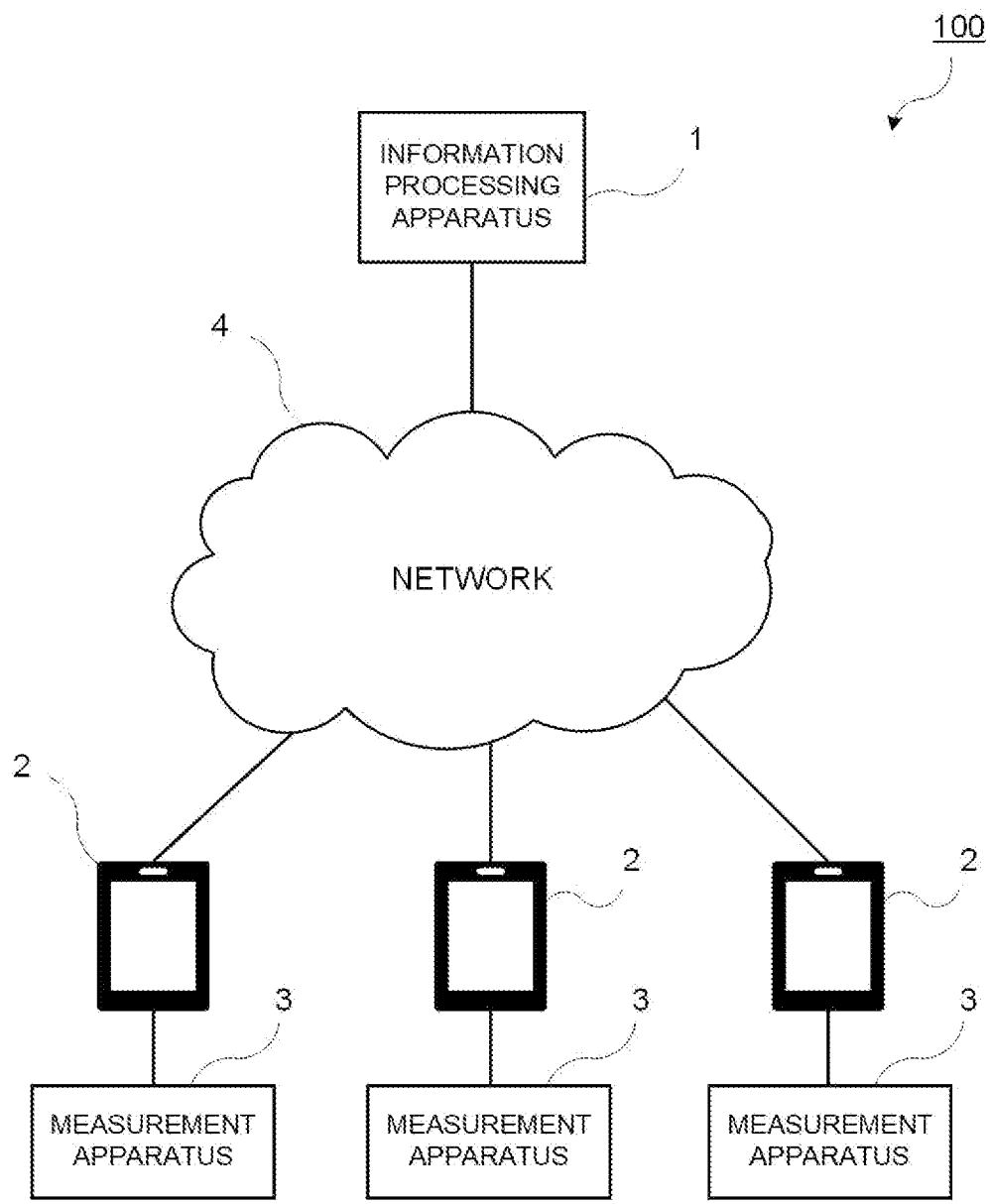
FIG. 2 is a diagram showing an overview of a configuration of a system 100.

FIG. 2 is a diagram showing an overview of a configuration of a system 100. As shown in the figure, the system 100 comprises an information processing apparatus 1 and a terminal 2 connected via a network 4. The terminal 2 is connected to a measurement apparatus 3.

The measurement apparatus 3 is configured to convert an odor contained in an expiration of a subject or an examinee into an electrical signal and outputs the electrical signal. The subject is a person who cooperates in providing odor data for a target disease and includes both affected person and unaffected person of the disease. The examinee is a person seeking a diagnosis as to whether he/she is affected with the disease.

The terminal 2 is configured to notify the information processing apparatus 1 of measurement information of the subject measured with the measurement apparatus 3. The terminal 2 determines whether the examinee measured with the measurement apparatus 3 is affected by using feature information obtained from the information processing apparatus 1. For the terminal 2, a personal computer, smartphone, tablet, or the like can be used.

The information processing apparatus 1 is configured to process the measurement information collected from the subject and to generate measurement information to be used in determining whether the examinee is affected. The information processing apparatus 1 can be a server or other computer.

The network 4 is a network that includes the Internet and enables communication between the information processing apparatus 1 and the terminal 2.

3. Configuration of Information Processing Apparatus 1

Figure 3:
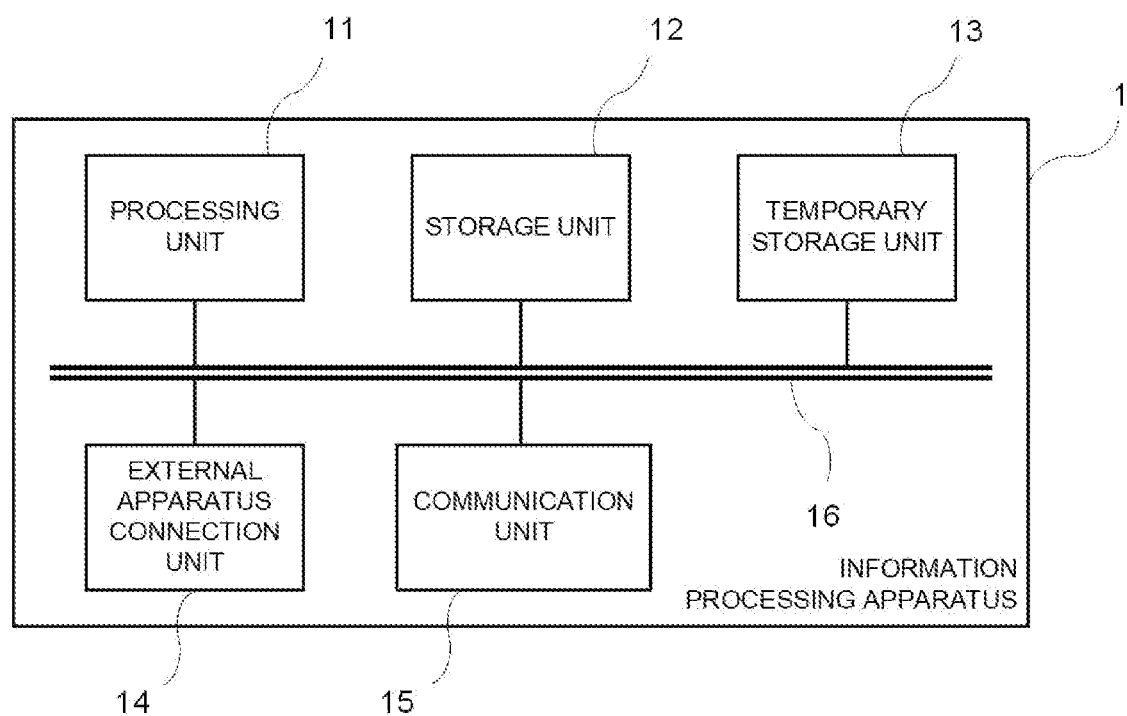
FIG. 3 is a diagram showing a configuration of an information processing apparatus 1.

FIG. 3 is a diagram showing a configuration of the information processing apparatus 1. As shown in the figure, the information processing apparatus 1 comprises a processing unit 11, a storage unit 12, a temporary storage unit 13, an external apparatus connection unit 14, and a communication unit 15, and these components are electrically connected inside the information processing apparatus 1 via a communication bus 16.

The processing unit 11 is realized by, for instance, a central processing unit (CPU), and operates according to a predetermined program stored in the storage unit 12 to realize various functions.

The storage unit 12 is a non-volatile storage medium that stores various information. It can be realized by a storage device such as a hard disk drive (HDD) or a solid state drive (SSD). The storage unit 12 can be arranged in another apparatus that can communicate with the information processing apparatus 1.

The temporary storage unit 13 is a volatile storage medium. It can be realized by a memory such as a random access memory (RAM), and can store information (argument, array, etc.) temporarily necessary when the processing unit 11 operates.

The external apparatus connection unit 14 is, for instance, a connection unit conforming to standards such as a universal serial bus (USB) or a high-definition multimedia interface (HDMI), and is capable of connecting an input apparatus such as a keyboard or a display apparatus such as a monitor.

The communication unit 15 is, for example, communication means conforming to a local area network (LAN) standard, and realizes communication between the information processing apparatus 1 and the network 4 such as the local area network or the Internet via the local area network.

A general-purpose server computer, a personal computer, or the like can be used for the information processing apparatus 1, and the information processing apparatus 1 may be configured using a plurality of computers.

4. Configuration of Terminal 2

Figure 4:
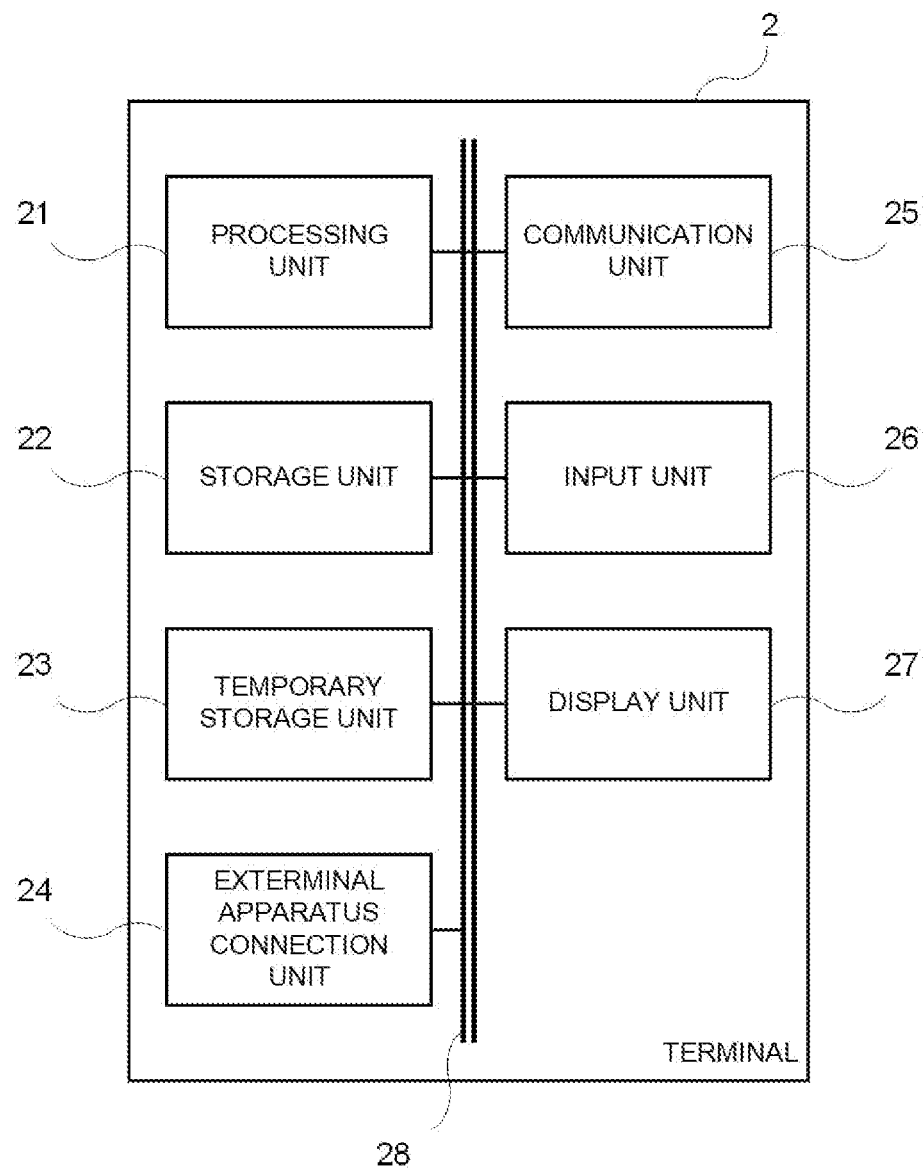
FIG. 4 is a diagram showing a configuration of a terminal 2.

FIG. 4 is a diagram showing a configuration of the terminal 2. As shown in the figure, the terminal 2 comprises a processing unit 21, a storage unit 22, a temporary storage unit 23, an external apparatus connection unit 24, a communication unit 25, an input unit 26, and a display unit 27. These components are electrically connected inside the terminal 2 via a communication bus 28.

The processing unit 21 is realized by, for instance, a central processing unit, and operates according to a predetermined program stored in the storage unit 22 to realize various functions.

The storage unit 22 is a non-volatile storage medium that stores various information.

The temporary storage unit 23 is a volatile storage medium. It can be realized by a memory, such as a random access memory, and can store information (argument, array, etc.) temporarily necessary when the processing unit 21 operates.

The external apparatus connection unit 24 is, for instance, a connection unit conforming to standards such as universal serial bus (USB) or Bluetooth (registered trademark), and may connect to the measurement apparatus 3, etc.

The communication unit 25 is, for instance, communication means conforming to a local area network (LAN) standard, and realizes communication between the information processing apparatus 1 and a network such as the local area network or the Internet via the local area network.

Further, the communication unit 25 also includes communication means that can communicate via a mobile phone network.

The input unit 26 is configured to receive operation input. The display unit 27 is configured to display information or the like on a screen. The input unit 26 and the display unit 27 may be integrated as a touch panel.

A general-purpose smartphone, a tablet terminal, or the like may be adopted for the terminal 2.

5. Configuration of Measurement Apparatus 3

Figure 5:
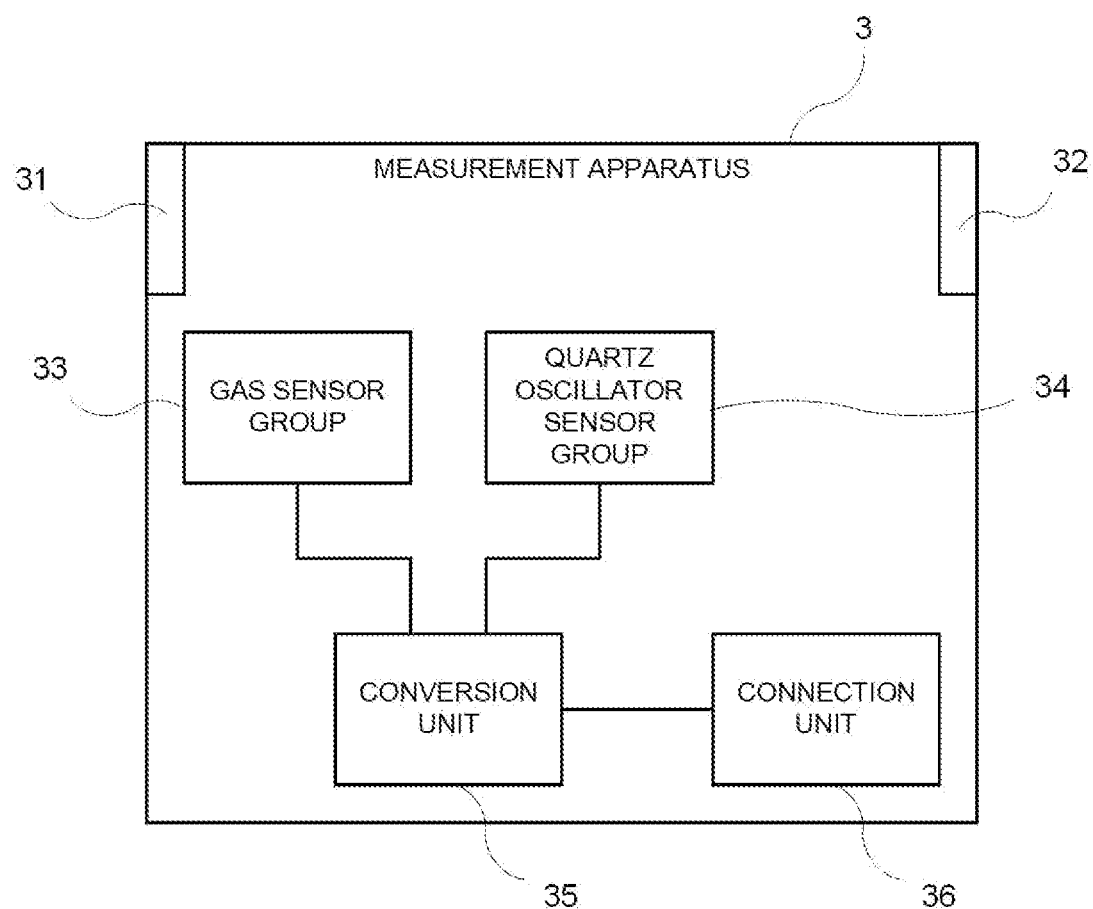
FIG. 5 is a diagram showing a configuration of a measurement apparatus 3.

FIG. 5 is a diagram showing a configuration of the measurement apparatus 3. As shown in the figure, the measurement apparatus 3 comprises an inlet 31, an outlet 32, a gas sensor group 33, a quartz oscillator sensor group 34, a conversion unit 35, and a connection unit 36. Although the measurement apparatus 3 using the gas sensor group 33 and the quartz oscillator sensor group 34 is described here, the sensor may be a semiconductor type such as an oxide semiconductor type or an organic semiconductor type, a quartz oscillator type using an epoxy resin film, a vinyl acetate resin film, a Langmuir-Blodgett film, or the like as a sensitive film, a SAW (surface acoustic wave) filter, or a FBAR (film bulk acoustic wave) filter, or the like.

The inlet 31 is a portion where an expiration of a subject or an examinee flows into the measurement apparatus 3, and a mouthpiece or the like is attached thereto. When an odor of sweat or excrement other than expiration is targeted, a pump or the like is used to let air containing the odor flow into the measurement apparatus 3 from the inlet 31. The outlet 32 is a portion where the expiration, etc. that has flowed into the measurement apparatus 3 from the inlet 31 is discharged.

The gas sensor group 33 is configured of a plurality of gas sensors, which detect gas such as carbon dioxide, carbon monoxide, methane, butane, ammonia, or the like.

The quartz oscillator sensor group 34 is configured of a plurality of quartz oscillator sensors, each of the quartz oscillator sensors has a quartz oscillator formed by a thin film with nonspecific adsorption property, and each of the quartz oscillator sensors deposited with a different compound. The deposited compound is, for instance, D-phenylalanine, D-tyrosine, DL-histidine, D-glucose, adenine, polyethylene, etc. For any one of these compounds, resonance frequency changes due to adhesion of odor component, and since degree of adhesion of the odor component varies from compound to compound, each of the quartz oscillator sensors can detect different odors. Details of the gas sensor group 33 and the quartz oscillator sensor group 34 are described in WO 2019/117099 A1, therefore description thereof will be omitted here.

The conversion unit 35 converts an analog electrical signal output from the gas sensor group 33 and the quartz oscillator sensor group 34 into a digital electrical signal. The connection unit 36 is, for instance, a connection unit conforming to standards such as universal serial bus (USB) or Bluetooth (registered trademark), and is communicatively connected to the terminal 2.

A thermometer, a hygrometer, a barometer, or the like may be arranged in the measurement apparatus 3, and temperature, humidity, atmospheric pressure, etc. obtained therefrom may be notified to the terminal 2 along with output of the gas sensor group 33 and the quartz oscillator sensor group 34. Although temperature, humidity, atmospheric pressure, etc. are omitted in the following description, they may be included in the measurement information or the feature information.

6. Functional Configuration of System 100

Figure 6:
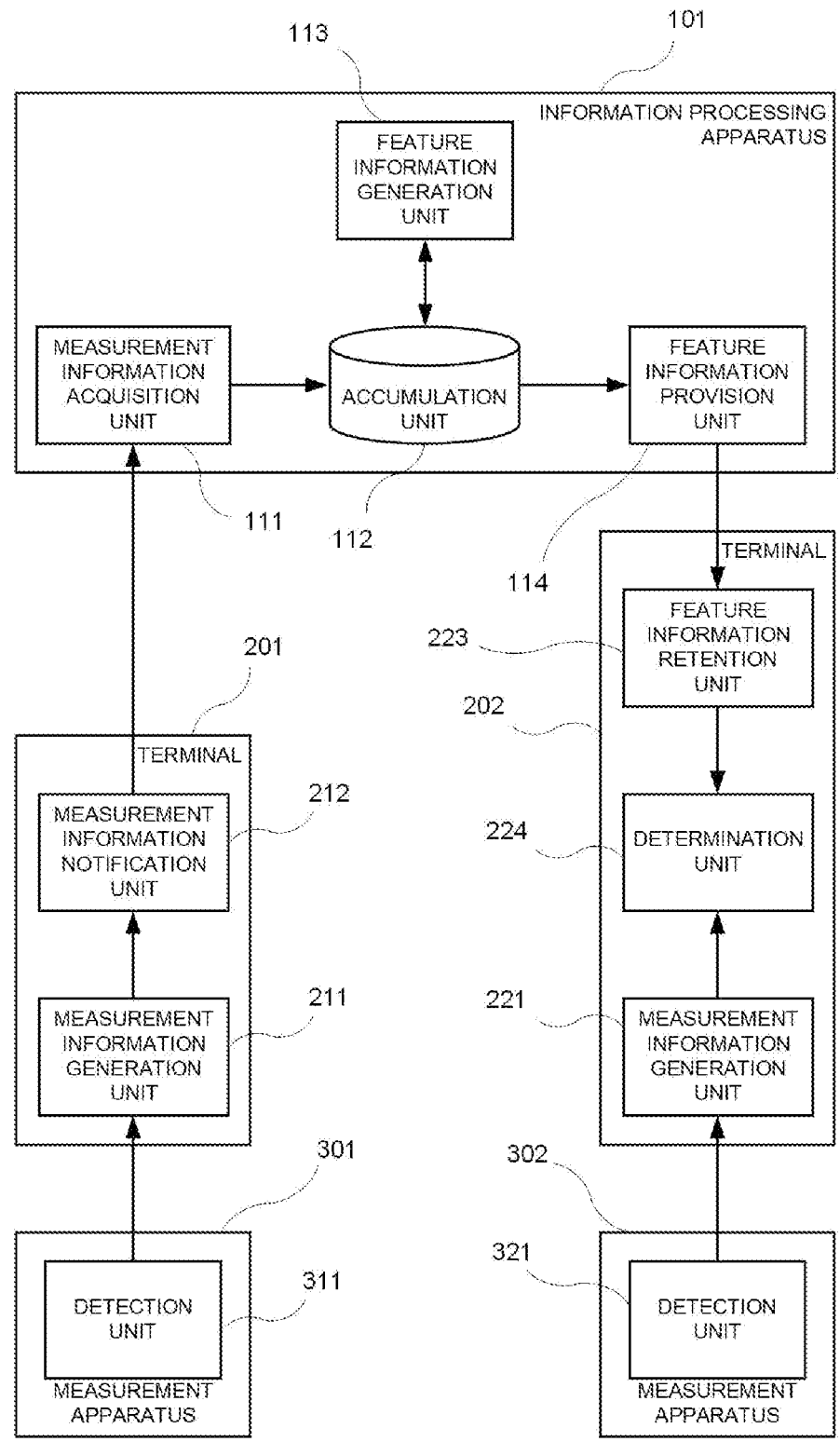
FIG. 6 is a block diagram showing a functional configuration of the system 100.

Next, a function of the system 100 will be described. FIG. 6 is a block diagram showing a functional configuration of the system 100.

As shown in the figure, the system 100 comprises a measurement apparatus 301, which is a first measurement apparatus, a terminal 201, which is a first terminal, an information processing apparatus 101, a measurement apparatus 302, which is a second measurement apparatus, and a terminal 202, which is a second terminal. The measurement apparatus 301 and the measurement apparatus 302, that is, the first measurement apparatus and the second measurement apparatus may be equivalent, but they may have different configurations and are therefore distinguished here. Similarly, the terminal 201 and the terminal 202, that is, the first terminal and the second terminal may have equivalent functions, but they may have different functions and are therefore distinguished here.

The measurement apparatus 301, which is the first measurement apparatus, comprises a detection unit 311. The detection unit 311 is configured to detect an odor of expiration of the subject using an odor sensor that includes at least a quartz oscillator sensor. The odor sensor is, for instance, the gas sensor group 33 and the quartz oscillator sensor group 34 described above.

The terminal 201, which is the first terminal, comprises a measurement information generation unit 211, which is a first measurement information generation unit, and a measurement information notification unit 212.

The measurement information generation unit 211 is configured to generate first measurement information based on a detection result of the detection unit 311 and affection information. Specifically, the measurement information generation unit 211 uses a resonance frequency value when the resonance frequency has stabilized after a predetermined time has elapsed since the resonance frequency of each quartz oscillator sensor began to change due to adhesion of an odor component to each quartz oscillator sensor of the quartz oscillator sensor group 34 of the detection unit 311 as the detection result, and accordingly uses information including the affection information indicating whether the subject is affected with a predetermined disease as first measurement information. If there is a quartz oscillator sensor whose resonance frequency does not change, that is, if there is a quartz oscillator sensor to which no odor component adhered, information to that effect shall be included in the detection result.

The measurement information notification unit 212 is configured to notify the first measurement information generated by the measurement information generation unit 211 to the information processing apparatus 101. The measurement information notification unit 212 may also be configured to notify the information processing apparatus 101 of the detection result of the detection unit 311 as it is without selecting a stable resonance frequency in the measurement information generation unit 211.

The information processing apparatus 101 comprises a measurement information acquisition unit 111, an accumulation unit 112, a feature information generation unit 113, and a feature information provision unit 114. The information processing apparatus 101 is realized by a program that allow the information processing apparatus 1 to operate as the information processing apparatus 101, which is a computer, and by allowing the program to operate, the information processing apparatus 101 comprises the measurement information acquisition unit 111, the accumulation unit 112, the feature information generation unit 113, and the feature information provision unit 114.

The measurement information acquisition unit 111 is configured to acquire the first measurement information notified by the terminal 201. Specifically, the measurement information acquisition unit 111 is configured to acquire measurement information including the detection result of detecting the odor of expiration of the subject using an odor sensor including at least a quartz oscillator sensor and the affection information indicating whether the subject is affected with a predetermined disease. Although the measurement information acquisition unit 111 is configured to acquire measurement information including, as a detection result, resonance frequency of each of the plurality of quartz oscillator sensors included in the odor sensor after a predetermined time has elapsed from the start of detection, the detection result of the detection unit 311 may be acquired as it is.

The accumulation unit 112 accumulates the measurement information (first measurement information) acquired by the measurement information acquisition unit 111. The accumulation unit 112 also accumulates the feature information generated by the feature information generation unit 113.

The feature information generation unit 113 is configured to generate feature information indicating a feature of expiration for a disease based on, among the measurement information (the first measurement information) acquired by the measurement information acquisition unit 111, the first measurement information, in which the affection information acquired by the measurement information acquisition unit indicates affection, and first measurement information, in which the affection information acquired by the measurement information acquisition unit indicates non-affection. That is, the feature information generation unit 113 is configured to generate feature information indicating a feature of expiration for the disease based on the detection result included in the measurement information in which the affection information indicates affection for the disease, and the detection result included in the measurement information in which the affection information indicates non-affection for the disease.

For instance, the feature information generation unit 113 statistically processes a plurality of measurement information acquired by the measurement information acquisition unit 111, and specify a feature that appears only in the detection result included in the measurement information in which the affection information indicates non-affection for the disease. Further, the feature information generation unit 113 may also perform machine learning based on pairs of the affection information and the detection result, and generate learned information outputting the affection information with the detection result as input as feature information.

The feature information provision unit 114 is configured to provide the feature information generated by the feature information generation unit 113 to terminal 202, which is the second terminal.

The measurement apparatus 302, which is the second measurement apparatus, comprises a detection unit 321, which is a second detection unit. The detection unit 321 is configured to detect the odor of expiration of the examinee using an odor sensor that includes at least a quartz oscillator sensor. The odor sensor is, for example, the gas sensor group 33 and the quartz oscillator sensor group 34 described above. The measurement apparatus 302 may have the same configuration as the measurement apparatus 301, but when it is clarified that part of the gas sensor group 33 and the quartz oscillator sensor group 34 is unnecessary in determining presence or absence of affection of a disease to be diagnosed, that is, when a sensor that do not affect a diagnosis result is included, the sensor can be omitted.

The terminal 202, which is the second terminal, comprises a measurement information generation unit 221, which is a second measurement information generation unit, a feature information retention unit 223, and a determination unit 224.

The measurement information generation unit 221 is configured to generate second measurement information based on the detection result of the detection unit 321.

Specifically, the measurement information generation unit 221 is configured to generate the measurement information based on the detection result of detecting the odor of expiration of the examinee using an odor sensor including at least a quartz oscillator sensor. The measurement information is the resonance frequency value of each of the plurality of quartz oscillator sensors included in the odor sensor after a predetermined time has elapsed from the start of detection.

The feature information retention unit 223 is configured to retain feature information provided by the information processing apparatus 101. When the feature information generation unit 113 generates the feature information through statistical processing, the feature information is information indicating a range including the resonance frequency when the odor of expiration of an affected person that is affected with a predetermined disease is detected using the odor sensor. In addition, when the feature information generation unit 113 generates the feature information by machine learning, the feature information is learned information outputting presence or absence of affection to a predetermined disease by machine learning based on an odor of expiration of an affected person suffering from the disease and an odor of expiration of an unaffected person that is unaffected with the disease.

The determination unit 224 is configured to determine a possibility of affection of the examinee for the disease based on the measurement information (the second measurement information) and the feature information. When the feature information generation unit 113 generates the feature information through statistical processing, the determination unit 224 determines a possibility of affection of the examinee for the disease by collating the measurement information and the feature information. Further, when the feature information generation unit 113 generates the feature information by machine learning, the determination unit 224 determines a possibility of affection of the examinee for the disease based on the measurement information and the feature information. Specifically, the determination unit 224 uses the measurement information as input and outputs a determination as to whether the examinee is affected with the disease.

Since the terminal 202 comprises the feature information retention unit 223, it can be used as a diagnostic apparatus even when communication with the information processing apparatus 101 is unavailable, i.e., in the so-called offline state. The diagnostic apparatus can be realized by allowing a computer, such as a smartphone, a tablet, or a personal computer, to operate with a program, and a diagnostic support apparatus implemented by a program that allows a computer to operate as a diagnostic support apparatus comprises a measurement information generation unit 221, which is a second measurement information generation unit, a feature information retention unit 223, and a determination unit 224.

Note that the terminal 201 and the terminal 202 may be realized by the same program, and may be provided as a terminal comprising the measurement information generation unit 211 or the measurement information generation unit 221, the measurement information notification unit 212, the feature information retention unit 223, and the determination unit 224.

7. Others

In FIG. 6, although a configuration in which the terminal 201 and the terminal 202 are connected to the information processing apparatus 101 as a functional configuration of the system 100 is shown, the terminal 202 and the measurement apparatus 302 are not required at the stage of collecting measurement information on expiration of the subject. Furthermore, after generating feature information based on the sufficiently collected measurement information of the expiration of the subject, the expiration of the examinee is measured for diagnosis, in which case, the terminal 201 and the measurement apparatus 301 are not required.

In addition, neither the terminal 201 nor the terminal 202 needs to constantly communicate with the information processing apparatus 101, and the terminal 201 may communicate when notifying the information processing apparatus 101 of the measurement information, and the terminal 202 may communicate when acquiring feature information from the information processing apparatus 101. Therefore, as long as the measurement information and the feature information can be exchanged, the measurement information and the feature information may be exchanged through a means other than communication, for example, through a storage medium such as a memory.

The present invention may be provided in each of the following aspects.

The system, wherein: the odor sensor comprised by the first detection unit includes a quartz oscillator sensor, and the odor sensor comprised by the second detection unit includes a quartz oscillator sensor.

An information processing apparatus, comprising: a measurement information acquisition unit configured to acquire measurement information including a detection result of detecting an odor of expiration of a subject using an odor sensor and affection information indicating presence or absence of affection of the subject for a predetermined disease; a feature information generation unit configured to generate feature information indicating a feature of expiration for the disease based on a detection result included in measurement information, in which the affection information indicates affection to the disease, and a detection result included in measurement information, in which the affection information indicates non-affection to the disease; and a feature information provision unit configured to provide the feature information to a terminal.

The information processing apparatus, wherein: the odor sensor includes a quartz oscillator sensor, and the measurement information acquisition unit is configured to acquire measurement information including, as the detection result, a resonance frequency of each of a plurality of quartz oscillator sensors included in the odor sensor after a predetermined time has elapsed from start of detection.

The information processing apparatus, wherein: the feature information generation unit is configured to statistically process a plurality of measurement information acquired by the measurement information acquisition unit, and among the detection results, specify a feature that appears only in a detection result included in measurement information in which the affection information indicates affection for the disease.

The information processing apparatus, wherein: the feature information generation unit is configured to perform machine learning based on a pair of the affection information and the detection result, and generate learned information that outputs affection information with detection result as input as the feature information.

A program that allows a computer to operate as an information processing apparatus, the information processing apparatus comprising: a measurement information acquisition unit configured to acquire measurement information including a detection result of detecting an odor of expiration of a subject using an odor sensor and affection information indicating presence or absence of affection of the subject for a predetermined disease; a feature information generation unit configured to generate feature information indicating a feature of expiration for the disease based on a detection result included in measurement information, in which the affection information indicates affection to the disease, and a detection result included in measurement information, in which the affection information indicates non-affection to the disease; and a feature information provision unit configured to provide the feature information to a terminal.

A program that allows a computer to operate as a diagnosis support apparatus, the diagnosis support apparatus comprising: a measurement information generation unit configured to generate measurement information based on a detection result of detecting an odor of expiration of an examinee using an odor sensor including at least a quartz oscillator sensor, wherein the measurement information is a value of resonance frequency of each of a plurality of quartz oscillator sensors included in the odor sensor after a predetermined time has elapsed from start of detection; a feature information retention unit configured to retain feature information, wherein the feature information is information indicating a range in which the resonance frequency is included when an odor of expiration of an affected person affected with a predetermined disease is detected using the odor sensor; and a determination unit configured to determine a possibility of affection of the examinee for the disease by collating the measurement information and the feature information.

A program that allows a computer to operate as a diagnosis support apparatus, the diagnosis support apparatus comprising: a measurement information generation unit configured to generate measurement information based on a detection result of detecting an odor of expiration of an examinee using an odor sensor including at least a quartz oscillator sensor, wherein the measurement information is a value of resonance frequency of each of a plurality of quartz oscillator sensors included in the odor sensor after a predetermined time has elapsed from start of detection; a feature information retention unit configured to retain feature information, wherein the feature information is learned information outputting presence or absence of affection to a predetermined disease by machine learning based on an odor of expiration of an affected person suffering from the disease and an odor of expiration of an unaffected person that is unaffected with the disease; and a determination unit configured to determine a possibility of affection of the examinee for the disease based on the measurement information and the feature information.

Of course, the above aspects are not limited thereto.

Furthermore, the present invention may be provided as a computer-readable non-temporary recording medium that stores the program.

What is claimed is:

1. A system, comprising:
    a first measurement apparatus including:
        a first detection unit including a first odor sensor, the first odor sensor being configured to detect an odor of each of a plurality of subjects, the first detection unit being configured to generate a first detection result corresponding to the detected odor of the plurality of subjects;
        a first terminal including a first processor and a first memory configured to store a first program, the first processor being configured to execute the first program so as to:
            obtain disease contraction information of the plurality of subjects, the disease contraction information indicating presence or absence of contraction of a predetermined disease with respect to the plurality of subjects;
            receive the first detection result from the first measurement apparatus;
            generate first measurement information based on the disease contraction information and the first detection result; and
            notify the first measurement information to an information processing apparatus;
    the information processing apparatus including a second processor and a second memory configured to store a second program, the second processor being configured to execute the second program so as to:
        acquire the first measurement information from the first terminal;
        generate feature information indicating a relationship between the odor and the predetermined disease, the relationship being obtained by statistical processing or machine leaning based on the first measurement information; and
        provide the feature information to a second terminal;
    a second measurement apparatus including:
        a second detection unit including a second odor sensor, the second odor sensor being configured to detect an odor of an examinee different from the plurality of subjects, the second detection unit being configured to generate a second detection result corresponding to the detected odor of the examinee; and
    the second terminal including a third processor and a third memory configured to store a third program, the third processor being configured to execute the third program so as to:
        receive the second detection result from the second measurement apparatus;
        generate second measurement information based on the second detection result;
        receive the feature information from the information processing apparatus and store the feature information in the third memory;
        determine a possibility of contraction of the predetermined disease with respect to the examinee based on the second measurement information and the feature information; and
        provide a determination result indicating whether the examinee contracted the predetermined disease based on the determined possibility.

2. The system according to claim 1,
    wherein the first odor sensor includes a first quartz oscillator sensor, and the second odor sensor includes a second quartz oscillator sensor.

3. The system according to claim 2,
    wherein each of the first and second quartz oscillator sensors is configured with a plurality of quartz oscillators,
    each of the plurality of quartz oscillators is configured with a film having a nonspecific adsorption property, and different compounds are deposited on the films of the plurality of quartz oscillators, respectively,
    a resonance frequency of each of the plurality of quartz oscillators is changed due to an adhesion state of a component of the odor on the different compounds on the films, and
    the third processor is further configured to determine the possibility of the contraction of the predetermined disease with respect to the examinee based on the resonance frequencies of the plurality of quartz oscillators of the second quartz oscillator sensor.

4. An information processing apparatus, comprising:
    a memory configured to store a program; and
    a processor configured to execute the program so as to:
        acquire measurement information, the measurement information including:
            a detection result of detecting an odor of a plurality of subjects using an odor sensor; and
            disease contraction information of the plurality of subjects, the disease contraction information indicating presence or absence of contraction of a predetermined disease with respect to the plurality of subjects;
        generate feature information indicating a relationship between the odor and the predetermined disease, the relationship being obtained by statistical processing or machine leaning based on the measurement information; and
        provide the feature information to an external terminal in which a possibility of contraction of the predetermined disease with respect to an examinee is determined by comparing another detection result of an odor of the examinee using the odor sensor with the feature information.

5. The information processing apparatus according to claim 4,
    wherein the odor sensor includes a plurality of quartz oscillators, and
    the detection result includes a resonance frequency of each of the plurality of quartz oscillators after a predetermined time has elapsed from start of the detecting of the odor.

6. The information processing apparatus according to claim 5,
    wherein each of the plurality of quartz oscillators is configured with a film having a nonspecific adsorption property, and different compounds are deposited on the films of the plurality of quartz oscillators, respectively,
    the resonance frequency of each of the plurality of quartz oscillators is changed due to an adhesion state of a component of the odor on the different compounds on the films, and
    the possibility of the contraction of the predetermined disease with respect to the examinee is determined by the external terminal based on the resonance frequencies of the plurality of quartz oscillators of the odor sensor.

7. The information processing apparatus according to claim 4,
wherein the processor is further configured to:
perform the statistical processing on the measurement information; and
specify a feature that appears only in a specific detection result of the detection results, the feature indicating the presence of the contraction of the predetermined disease in the disease contraction information during the statistical processing so as to generate the feature information.

8. The information processing apparatus according to claim 4, wherein:
wherein the processor is further configured to:
perform the machine learning on the measurement information; and
generate, as the feature information, learned information in which the disease contraction information is an output and the detection results are an input.

9. A non-transitory computer readable medium storing a program for causing a computer to execute a process by a processor so as to perform the steps of:
acquiring measurement information, the measurement information including:
a detection result of detecting an odor of a plurality of subjects using an odor sensor; and
disease contraction information of the plurality of subjects, the disease contraction information indicating presence or absence of contraction of a predetermined disease with respect to the plurality of subjects;
generating feature information indicating a relationship between the odor and the predetermined disease, the relationship being obtained by statistical processing or machine leaning based on the measurement information; and
providing the feature information to an external terminal in which a possibility of contraction of the predetermined disease with respect to an examinee is determined by comparing another detection result of an odor of the examinee using the odor sensor with the feature information.

10. The non-transitory computer readable medium according to claim 9,
wherein the odor sensor is configured with a plurality of quartz oscillators,
each of the plurality of quartz oscillators is configured with a film having a nonspecific adsorption property, and different compounds are deposited on the films of the plurality of quartz oscillators, respectively,
a resonance frequency of each of the plurality of quartz oscillators is changed due to an adhesion state of a component of the odor on the different compounds on the films, and
the possibility of the contraction of the predetermined disease with respect to the examinee is determined by the external terminal based on the resonance frequencies of the plurality of quartz oscillators of the odor sensor.

11. A non-transitory computer readable medium storing a program for causing a computer to execute a process by a processor so as to perform the steps of:
storing feature information indicating a relationship between an odor of each of a plurality of subjects and a predetermined disease, the relationship being obtained by statistical processing or machine leaning based on measurement information, the measurement information being obtained based on a detection result and disease contraction information, wherein
the detection result includes the odor of each of the plurality of subjects using an odor sensor that is configured with a plurality of quartz oscillators,
the disease contraction information indicates presence or absence of contraction of the predetermined disease with respect to the plurality of subjects,
a resonance frequency of each of the plurality of quartz oscillators is changed due to an adhesion state of a component of the odor on different compounds of the plurality of quartz oscillators, and
the feature information corresponds to a range of the resonance frequencies;
generating another measurement information based on a on another detection result of detecting an odor of an examinee different from the plurality of subject using the odor sensor, wherein the another measurement information is a value of another resonance frequency corresponding to the another detection result after a predetermined time has elapsed from start of-detection;
the detecting of the odor of the examinee; and
determining a possibility of contraction of the predetermined disease with respect to the examinee by collating the another measurement information and the feature information.

12. The non-transitory computer readable medium according to claim 11,
wherein each of the plurality of quartz oscillators is configured with a film having a nonspecific adsorption property, and different compounds are deposited on the films of the plurality of quartz oscillators, respectively,
the resonance frequency of each of the plurality of quartz oscillators is changed due to the adhesion state of the component of the odor on the different compounds on the films, and
the possibility of the contraction of the predetermined disease with respect to the examinee is determined based on the resonance frequencies and the another resonance frequency of the plurality of quartz oscillators of the odor sensor.

13. A non-transitory computer readable media medium storing a program for causing a computer to execute a process by a processor so as to perform the steps of:
storing feature information indicating a relationship between an odor of each of a plurality of subjects and a predetermined disease, the relationship being obtained by machine leaning based on measurement information, the measurement information being obtained based on a detection result and disease contraction information, wherein
the detection result includes the odor of each of the plurality of subjects using an odor sensor that is configured with a plurality of quartz oscillators,
the disease contraction information indicates presence or absence of contraction of the predetermined disease with respect to the plurality of subjects,
a resonance frequency of each of the plurality of quartz oscillators is changed due to an adhesion state of a component of the odor on different compounds of the plurality of quartz oscillators, and
the feature information corresponds to learned information that is obtained by performing the machine learning on the measurement information, and the learned information has the disease contraction information as an output and the detection results as an input;

generating another measurement information based on another detection result of detecting an odor of an examinee different from the plurality of subject using the odor sensor, wherein the another measurement information is a value of another resonance frequency corresponding to the another detection result after a predetermined time has elapsed from start of the detecting of the odor of the examinee; and determining a possibility of contraction of the predetermined disease with respect to the examinee based on the another measurement information and the feature information.

14. The non-transitory computer readable medium according to claim 13, wherein each of the plurality of quartz oscillators is configured with a film having a nonspecific adsorption property, and different compounds are deposited on the films of the plurality of quartz oscillators, respectively, the resonance frequency of each of the plurality of quartz oscillators is changed due to the adhesion state of the component of the odor on the different compounds on the films, and the possibility of the contraction of the predetermined disease with respect to the examinee is determined based on the resonance frequencies and the another resonance frequency of the plurality of quartz oscillators of the odor sensor.

\* \* \* \* \*